United States Patent [19]

Inoue et al.

[11] 3,988,728

[45] Oct. 26, 1976

[54] GRAPHIC DISPLAY DEVICE

[75] Inventors: Tadanari Inoue; Takashi Shinbata, both of Musashino, Japan

[73] Assignee: Yokogawa Electric Works, Ltd., Tokyo, Japan

[22] Filed: Oct. 20, 1975

[21] Appl. No.: 623,950

[52] U.S. Cl. .......................... 340/324 AD; 340/172.5
[51] Int. Cl.² .......................... G06K 15/20
[58] Field of Search .......................... 340/324 AD, 154

[56] References Cited

UNITED STATES PATENTS

| | | | |
|---|---|---|---|
| 3,614,766 | 10/1971 | Kievit | 340/324 AD |
| 3,643,252 | 2/1972 | Roberts | 340/154 |
| 3,911,420 | 10/1975 | Lampson | 340/324 AD |
| 3,952,296 | 4/1976 | Bates | 340/324 AD |

FOREIGN PATENTS OR APPLICATIONS

| | | | |
|---|---|---|---|
| 47-39607 | 1972 | Japan | 340/324 AD |

*Primary Examiner*—David L. Trafton
*Attorney, Agent, or Firm*—Parmelee, Johnson & Bollinger

[57] ABSTRACT

A graphic display device of the type which receives instructions from an external computer and, by successively scanning the rasters of a display matrix, displays patterns such as alphanumeric characters, symbols, etc. upon a cathode ray tube. The graphic display device has a pattern generator which stores patterns in raster form and generates signals for forming such patterns upon receipt of a pattern address signal designating the particular pattern to be formed, and a repeating raster designation signal designating the particular raster of stored pattern information to be accessed for each scan of the display matrix. Pursuant to the invention, the graphic display device comprises pattern shifting means for shifting, on demand and in an amount selected by the external computer, the display of a pattern in a direction transverse to the direction of raster scanning. The pattern shifting means comprises means for modifying the raster designation signal applied to the pattern generator to thereby relocate the individual rasters of the stored pattern within the display matrix being scanned. Pattern shifts thus may be effected without requiring the pattern generator to store additional pattern formation data.

12 Claims, 5 Drawing Figures

PATTERN IN PATTERN GENERATOR

DISPLAY ON CRT

GRAPHIC DISPLAY DEVICE

BACKGROUND OF THE INVENTION

1. Field of the Invention

This invention relates to graphic display devices such as those used as terminal devices for data processing systems, wherein a central computer supplies data to be graphically displayed, e.g., upon a cathode ray tube.

2. Description of the Prior Art

In a known type of graphic display device, video signals defining alphanumeric or graphic data are stored in a pattern generator, and, on instruction from an external computer, desired patterns are individually read out for display on a cathode ray tube (CRT) by means of a raster scanning system which draws the patterns, raster by raster, into display matrices sized to correspond to one character space.

In such known devices, the character matrices on the CRT have their positions fixed, and thus the display position of a stored pattern is also fixed. Elevating or lowering a character position, e.g. to form a subscript or superscript, or elevating or lowering a graphic element, e.g., to fill in a graph, has required that the pattern generator store a number of video signals which represent various positional states to be assumed by a pattern. A significantly larger memory is required but the larger memory does not increase the variety of patterns available for display. For various reasons a satisfactory solution to the problem of shifting a pattern display position, so that it overlaps two display matrices, has not been found.

SUMMARY OF THE INVENTION

It is a principal object of the invention to provide an improved graphic display device to receive instructions from an external computer and to display graphic patterns in accordance therewith. It is a specific object of the invention to provide a graphic display device which is capable of displaying patterns in arbitrary positions without increasing the amount of data required to be stored in the pattern generator. Still another object of the invention is to provide a graphic display device more suitable for commercial use.

In a preferred embodiment of the invention to be described hereinbelow in detail, the graphic display device is of the kind displaying patterns on a cathode ray tube by scanning successive rasters of the pattern within a display matrix, the device being equipped with a pattern generator storing patterns in raster form and arranged to generate a video pattern display signal upon receiving a pattern address signal to designate the particular pattern to be formed, and a repeating raster designation signal to designate the particular raster of the pattern to be accessed. In accordance with the invention, the graphic display device has pattern shifting means for shifting, on demand and in an amount selected by the external computer, the display of the pattern in a direction transverse to the direction of raster scanning, said pattern shifting means comprising means for modifying the raster designation signal applied to the pattern generator to thereby relocate individual rasters of the stored pattern within the display matrix being scanned. This arrangement requires that the pattern generator memory store formation data for only one set of characters, and the pattern generator memory can effect pattern shifts with a small storage capacity.

Other objects, aspects and advantages of the invention will be pointed out in, or apparent from, the detailed description hereinbelow, considered together with the following drawings.

DESCRIPTION OF THE PREFERRED EMBODIMENT

Figure 1:
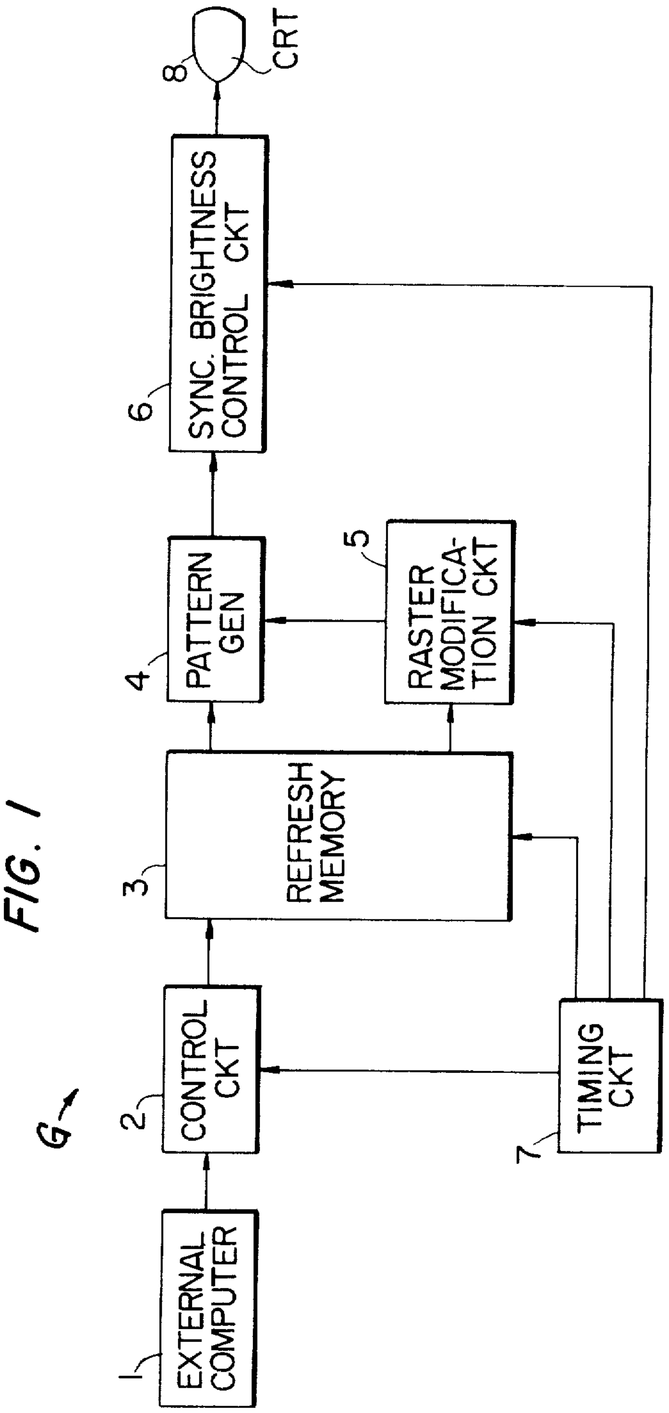
FIG. 1 is a schematic diagram illustrating a graphic display device constructed in accordance with the invention.

FIG. 1 illustrates a graphic display device G constructed in accordance with the invention and connected to an external electronic computer 1 which provides information including data and instructions respecting graphic patterns to be displayed. The graphic display device G comprises a control circuit 2 receiving the data and instructions, a refresh memory 3, a pattern generator 4, a raster modification circuit 5, a synchronous brightness control circuit 6, a timing circuit 7, and a cathode-ray tube (CRT) 8.

The control circuit 2 causes the refresh memory 3 to store received data from the computer 1, and stored data then is read out during a display cycle and is supplied in part directly to the pattern generator 4 and in part to the raster modification circuit 5. The data supplied from the refresh memory 3 to the pattern generator 4 includes an address signal which designates the location of a stored pattern to be displayed. The data supplied from refresh memory 3 to the raster modification circuit 5 includes a signal specifying a desired raster modification. The raster modification circuit, in turn, generates a raster designation signal for the pattern generator 4. The pattern generator, with pattern address and raster being so designated, is arranged to generate a video signal for the synchronous brightness control circuit 6, which in turn generates a brightness signal for the CRT 8.

The timing circuit 7 supplies timing signals to the control circuit 2, refresh memory 3, raster modification circuit 5 and synchronous brightness control circuit 6 respectively, to operate these circuits in the appropriate sequential order. The signal from the timing circuit 7 to the raster modification circuit 5 is one arranged to sequentially designate the next raster to be displayed.

Figure 2:
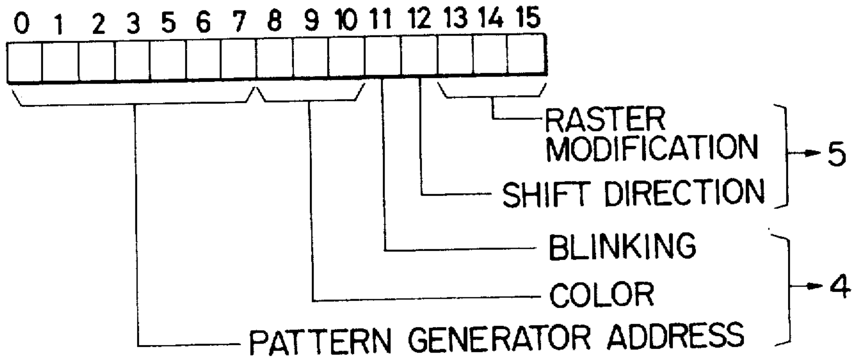
FIG. 2 is a diagram showing the format of data in the refresh memory.

The data stored in the refresh memory 3 has a format, as shown in FIG. 2, which includes (1) pattern generator address data for accessing the desired pattern in the pattern generator 4, (2) color data for designating the color in which the desired pattern is to be displayed, (3) blinking data for designating whether blinking is needed during pattern display, (4) shift direction data for designating the direction in which the pattern is to be shifted, and (5) raster modification data for designating the amount of a pattern shift. Upon command from the timing circuit 7, the pattern generator address data, the color designating data, and the blinking designating data are supplied as signals to the pattern generator 4; and the pattern shift direction designating data and the raster modification data are supplied to the raster modification circuit 5.

The raster modification circuit 5 modifies the raster designating signal from the timing circuit 7 in accordance with commands supplied by pattern shift direction designating signal and the raster modification signal from the refresh memory 3, and supplies the modified signal in the form of an effective raster designating signal to the pattern generator 4, which in turn generates the video signal corresponding to the newly designated raster.

Figure 3:
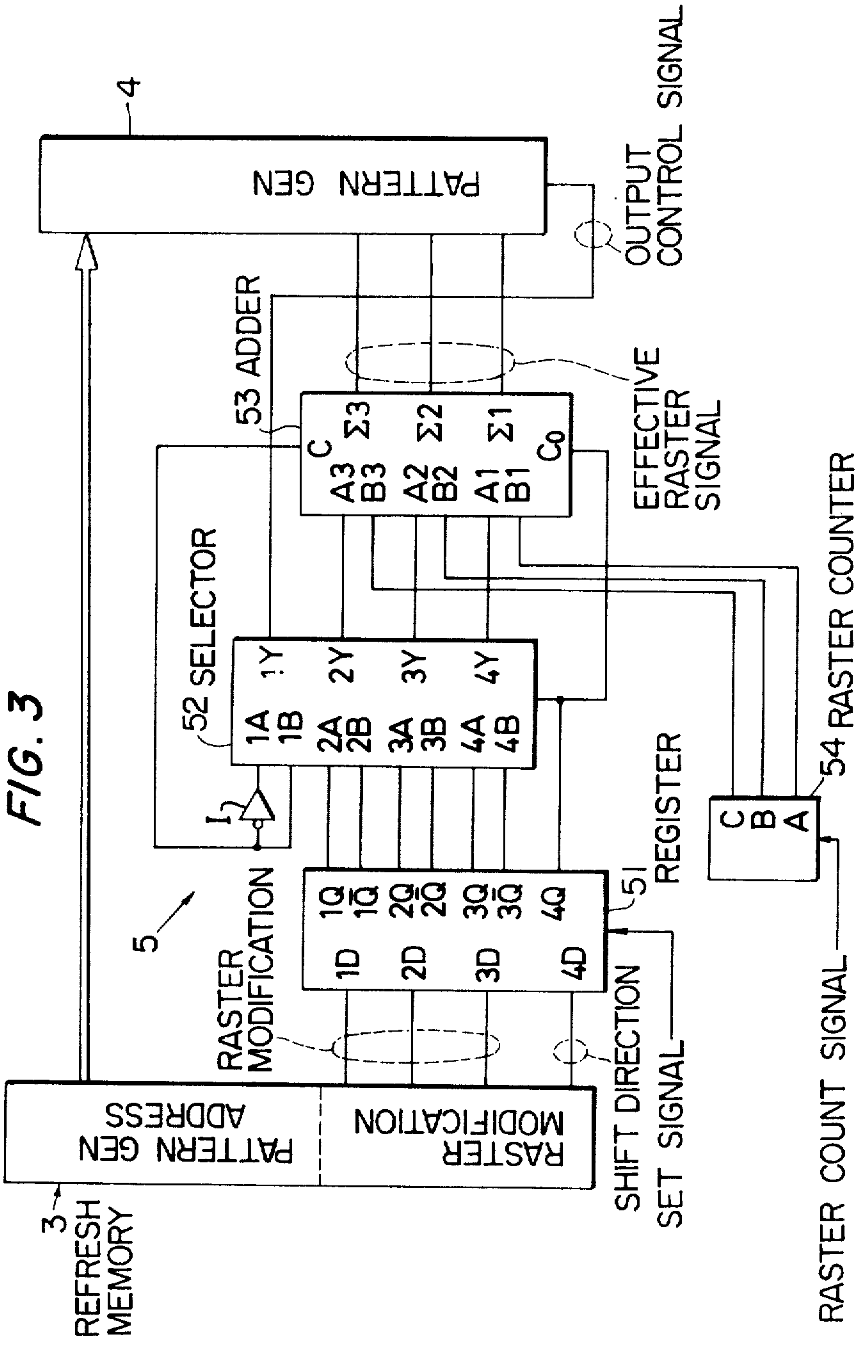
FIG. 3 is a schematic diagram showing in greater detail the raster modification circuit of FIG. 1.

FIG. 3 illustrates the construction of the raster modification circuit 5 in detail. As shown in FIG. 3, the circuit comprises a register 51, a direction selector 52, an adder 53, and a raster counter 54. The register 51 is loaded with both the raster modification data and the pattern shift direction designating data which has been read out of the refresh memory 3. The raster modification signal is set in the first to third places 1D to 3D, and the pattern shift direction designating signal in the fourth place 4D of the register 51. The register 51 supplies its data to the direction selector 52, the raster modification signal being received at terminals 2A, 2B, 3A, 3B and 4A, 4B in complementary positive and negative logic values as an input signal, and the pattern shift direction designating signal being received as a polarity control signal, as will be described below. The selector 52 also receives at terminal 1B the carry signal from terminal C of the adder 53 of the following stage, as well as its negative value through inverter I at terminal 1A. The direction selector 52 selects either the signals at input terminals 1A, 2A, 3A and 4A, which are the positive logic signals, or the signals at input terminals 1B through 4B, which are the negative logic signals, according to the logic value of the polarity control signal, and generates corresponding output signals at output terminals 1Y to 4Y.

The signal at the output terminal 1Y is supplied as a control signal to the pattern generator 4, and the signals at the output terminals 2Y to 4Y are supplied at terminals A3, A2 and A1 respectively as one addend for the adder 53, another addend being supplied by the data at terminals B3, B2 and B1 from the raster counter 54. Further, the signal at the terminal 4Q of the register 51, i.e., the pattern shift direction designating signal, is supplied as an additional addend to the carry signal input terminal Co of the adder 53, which is arranged so that when the signal applied thereto is 1, the adder 53 increases its sum by 1.

The adder 53 thus adds the value represented by the output signal from the direction selector 52, the value represented by the output signal from the raster counter 54, and the value of the signal from the terminal Co, and generates a sum signal at terminals $\Sigma 1$, $\Sigma 2$ and $\Sigma 3$ which forms an effective raster designating signal to the pattern generator 4.

A specific example of the operation of the graphic display device G will be described by referring to FIG. 4*a*, which represents a pattern stored in the pattern generator 4. One pattern unit comprises the amount of material which can appear in a matrix square for one character space on the CRT screen. A pattern representing a character, symbol or graph is formed by a combination of dots, and a matrix square of dots for one pattern by 8 rows corresponding to rasters, and 8 dot luminant positions or columns assigned to each raster. Thus, in the pattern generator, each pattern can be defined in a memory region with a memory capacity of 8 words of 8 bits each.

Figure 4A:
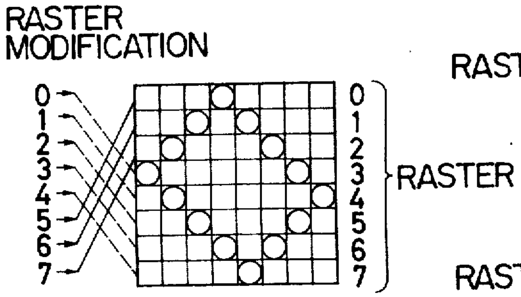
FIGS. 4*a* and 4*b* are diagrams of pattern matrices showing how the graphic display device of FIG. 1 shifts patterns.
Figure 4B:
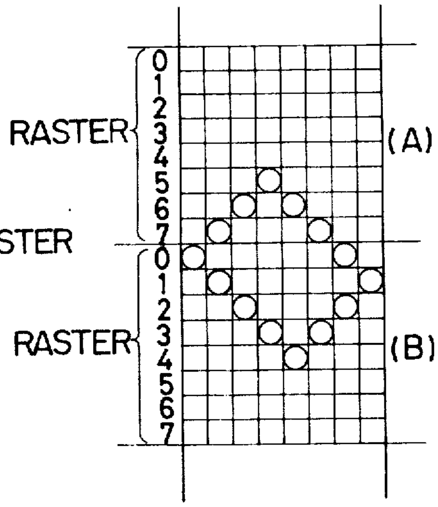

Assume that it is desired to have the pattern in FIG. 4*a* displayed as in FIG. 4*b* on the CRT over two display matrix squares A and B. To accomplish this, the pattern must be shifted down by an amount corresponding to 5 rasters in matrix square A, and must be shifted up by an amount corresponding to 3 rasters in matrix square B. In accordance with the present invention, this pattern shifting is effected by modifying the raster designating data which is supplied to the pattern generator 4. The modification of raster designation data, as previously explained, is carried out by the raster modification circuit 5 in accordance with the instructions supplied from the refresh memory 3. To display the pattern as in matrix square A, the data supplied from the refresh memory 3 to the raster modification circuit 5 designates the shift direction as "down" and the amount of raster modification as 5. The raster modification signal is given as a binary 101 (or decimal 5), and the pattern shift direction designating signal is given as 1 in the format shown in FIG. 2.

The raster modification data is read out of the refresh memory 3 and set in the register 51 whereby the signal 101 appears at register output terminals 1Q to 3Q, and the signal 010 (or decimal 2) at the output terminals $\overline{1Q}$ to $\overline{3Q}$, and the signal 1 at the output terminal 4Q. The selector 52, when given these signals, selects the signals at the B input terminals 1B through 4B as long as the signal at the terminal 4Q is 1. Thus the signal 010 is supplied to the A terminals of the adder 53. To this value the value 1 supplied from the register 51 through the terminal Co is added, resulting in the value 011 in the adder 53. Then this value and the value of the data at the B terminals from the raster counter 54 are added together.

The raster counter 54 is arranged to repeat counting binarily up from 0 to 7 every 8 raster sweeps, and the data at any given time in the raster counter 54 indicates the raster number of a line of display on the CRT, as shown for example in FIG. 46. When the data in the raster counter 54 is 0, the data in the adder 53 is 3, and the carry signal at terminal C is 0. Therefore the signal at the terminal 1Y of the selector 52 is 0. This signal, applied as an output control signal to the pattern generator 4, is arranged to inhibit the pattern generator from generating an output. This inhibited state is maintained during the period no carry signal is generated by the adder 53, i.e., until the data in the raster counter reaches 4, and therefore, no pattern appears in rasters 0 to 4 in the matrix square A of the CRT. When the data in the raster counter 54 reaches 5, the data in the adder 53 becomes 0, thus designating the effective pattern raster 0, whereby a carry signal is generated. As a result, the signal at the terminal 1Y of the selector 52 becomes 1 and the inhibited output of the pattern generator 4 is released. This allows the pattern generator to deliver the portion of its output corresponding to the raster 0 of the pattern in FIG. 4*a* as demanded by the effective raster designation signal 0 supplied from the adder 53. In this way, the topmost line of the pattern appears only at display raster 5 of the matrix square A, and the rest of the pattern continues at the display rasters 6 and 7.

To achieve the display of matrix square B, the data from the refresh memory 3 to the raster modification circuit 5 must be up for the pattern shift direction designating signal, and 3 for the raster modifying signal.

More specifically, in the data stored in the refresh memory 3, the raster modifying signal must be binary 011 (or decimal 3) and the shift direction designating signal be 0. When this data is read out of the refresh memory 3 and set in the register 51, an output 011 appears at the output terminals 1Q to 3Q, and an output 100 at $\overline{\mathbf{1Q}}$ to $\overline{\mathbf{3Q}}$, and an output 0 at 4Q. These signals are supplied to the selector 52, which in turn selects the signals at the A input terminals since the signal at terminal 4Q is 0. As a result, the signal 011 is supplied to the adder 53. In this state, the signal 0 is supplied to the terminal Co from the register 51, and hence the value set in the A terminals of adder 53 remains 011, to which the data at the B terminals from the raster counter 54 is added. When the data in the raster counter 54 is 0, the data in the adder 53 is 3. In this state, the carry signal is 0. However, because its inverted logic value at terminal 1A is selected by the selector, to cause a 1 signal to be generated at the terminal 1Y, the output of the pattern generator 4 is not inhibited and the portion of the pattern generator output corresponding to raster 3 of the pattern in FIG. 4*a* is generated. In the matrix square B, therefore, raster 3 of the pattern appears in display raster 0, and the rest of the pattern appears in the subsequent rasters. When the data in the raster counter 54 reaches 5, the data in the adder 53 becomes 0 and a 1 carry signal is generated, to cause the signal at terminal 1Y to become 0. As a result, the output of the pattern generator 4 is inhibited, and no pattern appears at display rasters 5, 6 and 7. The two portions of the pattern appearing in the matrix squares A and B are visually synthesized into a complete pattern which has been shifted down by the amount corresponding to 5 rasters in matrix square A.

Thus, in the graphic display device G described above, the amount of pattern shift can be arbitrarily selected to enable the pattern display position on the CRT to be arbitrarily shifted in a direction perpendicular to the raster lines. This obviates the need for a stock of video signals corresponding to different positional states to be assumed by each pattern, with the result that the memory of the pattern generator can be efficiently used.

Although a specific embodiment of the invention has been disclosed herein in detail, it is to be understood that this is for the purpose of illustrating the invention, and should not be construed as necessarily limiting the invention, since it is apparent that many changes can be made to the disclosed structures by those skilled in the art to suit particular applications.

We claim:

1. A graphic display device of the type receiving instruction from an external computer and, by scanning a succession of rasters in individual display matrices, displaying alphanumeric or graphic patterns upon a cathode ray tube, the graphic display device having a pattern generator for storing pattern data in raster form and for generating a series of raster display signals for a display matrix upon receiving a pattern address signal designating the particular pattern to be formed and a repeating raster designation signal designating the individual rasters of the selected pattern to be scanned, the display device being characterized by:

pattern shifting means for shifting, on demand and in an amount selected by the external computer, the display of a pattern in a direction transverse to the direction of raster scanning, said pattern shifting means comprising means for modifying the raster designation signal applied to the pattern generator to thereby relocate the individual rasters of the stored pattern within the display matrix being formed, whereby a selected portion of the pattern may be displayed at a shifted position within the matrix, thereby permitting a pattern to be displayed over two different display matrices without requiring the pattern generator memory to store extra formation data.

2. A graphic display device as claimed in claim 1 wherein the means for modifying the raster designation signal comprises means for adding to the repeating raster designation signal a signal indicating the number of rasters the pattern is to be shifted, and means for inhibiting display of the remainder of the pattern after the selected amount of the pattern has been scanned.

3. A graphic display device as claimed in claim 2 wherein the adding means is arranged to generate a carry signal when the sum of the shift amount signal and the raster designation signal exceeds the number of rasters in a display matrix, the inhibiting means being responsive to the carry signal.

4. A graphic display device as claimed in claim 1 wherein the means for modifying the raster count signal is arranged to receive a shift direction signal to indicate the direction a pattern is to be shifted, and a raster modification signal to indicate the amount the pattern is to be shifted, and wherein the modifying means comprises:

means for registering the raster modification signal and its complement, means for selecting between the raster modification signal and its complement in accordance with the shift direction signal, and means for adding the selected signal to the repeating raster designation signal to develop an effective raster designation signal to be applied to the pattern generator, whereby the individual rasters of the stored pattern are shifted within the display matrix being scanned.

5. A graphic display device as claimed in claim 4 wherein the adding means is arranged to generate a carry signal, and wherein the modifying means further comprises means responsive to the carry signal for inhibiting display of a portion of the stored pattern.

6. A graphic display device as claimed in claim 4 wherein the adding means is arranged to add a unit to the developed signal whenever the complement of the raster modification signal is selected by the shift direction signal.

7. A method for operating a graphic display device of the type receiving instructions from an external computer and, by successively scanning the rasters of an individual display matrix, displaying alphanumeric and graphic patterns upon a cathode ray tube, the graphic display device having a pattern generator storing patterns in raster form and generating a series of raster display signals upon receiving a pattern address signal designating the particular pattern to be formed and a repeating raster designation signal designating the individual rasters of stored information to be accessed, the method of operation being characterized by:

shifting the display of a pattern as requested by the external computer in a direction transverse to the direction of a raster scanning, said shifting step comprising modifying the raster designation signal applied to the pattern generator to relocate the individual rasters of the stored pattern within the display matrix being scanned, whereby a stored pattern may be displayed with portions in different display matrices without increasing the amount of information to be stored in the pattern generator memory.

8. A method for operating a graphic display device as claimed in claim 7 wherein the step of modifying the raster designation signal comprises adding to the raster designation signal a signal indicating the number of rasters the pattern is to be shifted, and inhibiting display of the remainder of the pattern after the selected amount of the pattern has been scanned.

9. A method for operating a graphic display device as claimed in claim 8 further comprising generating a carry signal when the sum of the shift amount signal and the raster designation signal exceeds the number of rasters in a display matrix and inhibiting display in response to the carry signal.

10. A method of operating a graphic display device as claimed in claim 7 wherein the device is arranged to receive a shift direction signal to indicate the direction a pattern is to be shifted, and a raster modification signal to indicate the amount the pattern is to be shifted, and wherein the raster modifying step comprises:

registering the raster modification signal and its complement, selecting between the raster modification signal and its complement in accordance with the shift direction signal, and adding the selected signal to the repeating raster designation signal to develop an effective raster designation signal, and applying the effective raster designation signal to the pattern generator, whereby the individual rasters of the stored pattern are shifted within the display matrix being scanned.

11. A method of operating a graphic display device as claimed in claim 10 further comprising generating a carry signal when the added signals exceed a prescribed value, inhibiting display of a portion of the stored pattern in response to the carry signal.

12. A method of operating a graphic display device as claimed in claiam 10 further comprising adding a unit to the developed signal whenever the complement of the raster modification signal is selected by the shift direction signal.

* * * * *